United States Patent [19]

Johnson

[11] 4,164,294
[45] Aug. 14, 1979

[54] METHOD FOR FILLING A POTATO STORAGE FACILITY

[76] Inventor: Lynn F. Johnson, 431 Calder, American Falls, Id. 83211

[21] Appl. No.: 717,291

[22] Filed: Aug. 24, 1976

[51] Int. Cl.$^2$ .................. B65G 3/10; A01F 25/00
[52] U.S. Cl. .................. 414/786; 198/364; 198/598; 414/300
[58] Field of Search .................. 209/73, 75, 97, 102, 209/123, 240, 255, 259, 307, 125, 257; 214/46, 16 R, 17 C, 17 CA, 508, 152; 198/364, 367, 369, 370, 598, 318, 316

[56] References Cited

U.S. PATENT DOCUMENTS

| 649,365 | 5/1900 | Scott | 214/16 R |
|---|---|---|---|
| 2,334,384 | 11/1943 | Cohen | 198/369 |
| 2,760,656 | 8/1956 | Peters | 214/46 |
| 2,885,065 | 5/1959 | Piper | 198/364 |
| 3,209,932 | 10/1965 | Schiltz | 214/508 X |
| 3,282,393 | 11/1966 | Graves et al. | 198/598 |
| 3,365,050 | 1/1968 | Taylor | 198/316 |
| 3,490,615 | 1/1970 | Sackett | 214/16 R |
| 3,550,752 | 12/1970 | Gregor | 198/610 X |
| 3,779,379 | 12/1973 | Buchbinder | 209/102 |
| 3,998,396 | 12/1976 | Umphrey et al. | 209/257 X |

*Primary Examiner*—Allen N. Knowles
*Assistant Examiner*—Fred A. Silverberg
*Attorney, Agent, or Firm*—Lynn G. Foster

[57] ABSTRACT

A method of placing bulk potatoes in a storage facility, the method comprising a powered potato conveyor external to the storage facility upon which a stream of potatoes is deposited. Thereafter the stream of potatoes is deposited upon at least one potato conveyor belt located in the upper portion of the storage facility and extending the full axial length thereof. Potatoes are shaken by vibration of the external conveyor to remove dirt and other tare, and a picking station is provided exterior to the facility wherein remaining foreign objects are removed manually prior to storage, tare conveyor belts being provided to collect and displace the dirt and foreign objects to tare trucks for disposal. Inside the storage enclosure, the potatoes are moved gently from one or more main storage conveyors by a rotating brush onto one or more cross conveyor belts selectively settable at any point along the entire length of the main storage conveyor, and are evenly distributed across the enlarging potato pile below. The method results in minimum bruising of potatoes, maintaining the proper environment within the facility, keeping dirt outside the facility, filling the facility evenly to maximum capacity, operating with fewer personnel, and can be manufactured and installed at reduced costs compared to present apparatus. In another embodiment, the method provides a displaceable unloading apron or hopper and picking stations which are provided for accommodating a controlled flow of potatoes from an end dump truck into a storage facility with controlled tare removal in a fraction of the time and with less potato damage than occurs using prior art systems.

2 Claims, 4 Drawing Figures

METHOD FOR FILLING A POTATO STORAGE FACILITY

BACKGROUND

1. Field of Invention

The present invention relates broadly to the art of storing potatoes and more particularly to novel apparatus and methods of placing bulk potatoes into a potato storage facility, utilizing a novel assemblage and cooperation between potato conveyors, potato hauling trucks and the potato storage enclosure.

2. Prior Art

Heretofore, potato storage facilities have often been filled by driving potato carrying trucks into the interior of the facility for storage, with subsequent distribution and piling of the potatoes by potato pilers and the like. Ground level conveyor belts have also been used to transport and aid the delivery and piling of potatoes inside the "spud cellar" type facility, but such belts have most often been contained wholly in the facility. These methods have created a number of problems, it being difficult to evenly distribute potatoes in the facility by these methods, and the facility access doors must be opened to admit the trucks, thereby disrupting the desirably controlled environment within the facility. Further, tare in the form of dirt, dust, vines and other foreign material and objects are carried with potatoes into the interior of the facility, creating problems with their removal and control and further adversely affecting the environment both for potato storage and personnel comfort and health. Such prior art methods also typically require numerous personnel and often result in facilities being utilized to less than full capacity.

BRIEF SUMMARY AND OBJECTS OF THE PRESENT INVENTION

With the foregoing in mind, the present invention provides automated novel methods and apparatus for efficiently filling a potato storage facility. The present invention utilizes a network of tare removing conveyors accommodating displacement of potatoes from a series of delivery trucks at an unloading site outside the storage facility to a movable instantaneous dumping site within the potato storage facility, depositing the potatoes in undamaged condition in a controlled fashion until the entire facility is expeditiously filled. Foreign objects and other foreign material are substantially excluded from the potatoes before the potatoes enter the facility, and the facility is filled to optimum capacity with clean potatoes while the environment therein is maintained in a carefully controlled condition desirable for potato storage to prevent deterioration. Fewer personnel are required and the apparatus may be constructed and maintained more economically than prior art arrangements.

It is a primary objective of the present invention to provide an improved novel apparatus and related methods of filling a potato storage enclosure.

It is another object of the present invention to provide a novel apparatus and associated methods reducing manufacturing and installation cost and requiring fewer personnel to operate in storing potatoes.

It is a further object of the present invention to provide novel apparatus and associated methods of filling a potato storage facility whereby damage to the potatoes is minimized.

A still further object of the present invention is to provide methods and apparatus for filling a potato storage facility with minimal or no disruption of the potato storage environment therein.

It is another object of the present invention to provide a novel potato handling and storage system which excludes a substantial amount, if not all, of the foreign material and objects (tare) from entering the storage enclosure along with the potatoes.

Another object of this invention is to novelly provide for the efficient disposal of foreign objects and material separated from the potatoes.

Another object of the present invention is to provide improved working conditions for personnel engaged in filling a potato storage facility.

A further object is to fill a potato storage facility in a manner maintaining a desired controlled environment within and substantially excluding foreign material from the facility.

Another object is to provide apparatus and methods wherein potatoes are novelly conveyed into a storage facility at high elevation so as to minimize or eliminate the use of a conventional potato piler within the facility and to avoid interference with conventional air ducts within the facility.

Another object of the invention is to provide for minimum turn around time of potato hauling trucks so that a minimum number of trucks need be used.

Another object of the invention is to provide for control of the rate with which potatoes pass through a picking station area for efficient removal of at least some tare.

A further and no less important object is the provision of novel potato filling system, comprising methods and apparatus, possessing one or more of the following features: (a) less potato bruise damage; (b) faster handling; (c) lower costs of construction and operation; (d) improved tare removal; (e) segregation and removal of tare outside the storage building; (f) retention of a closed environment within the storage building during filling; (g) less interference with and more rapid use of conventional air circulation and distribution equipment in the storage enclosure; (h) uniform storage depth thereby increasing storage capacity; (i) accommodating transportation of potatoes in beet trucks thereby decreasing truck time and needed capital equipment investment where beets and potatoes are both raised; (j) use of an unloading apron approach; (k) use of a novel network of conveyors; (l) use of tare removing vibrating conveyors for manual picking stations; (m) use of brushes to displacing potatoes from one conveyor to another; (n) use of selectively displaceable suspended elevated cross conveyors; (o) use of a novel unloading apron and picking table combination to accommodate higher speed truck unloading.

BRIEF DESCRIPTION OF THE DRAWINGS

FIG. 4 is an elevational view of the cross conveyor of FIG. 1.

DETAILED DESCRIPTION OF THE ILLUSTRATED EMBODIMENTS

Figure 1:
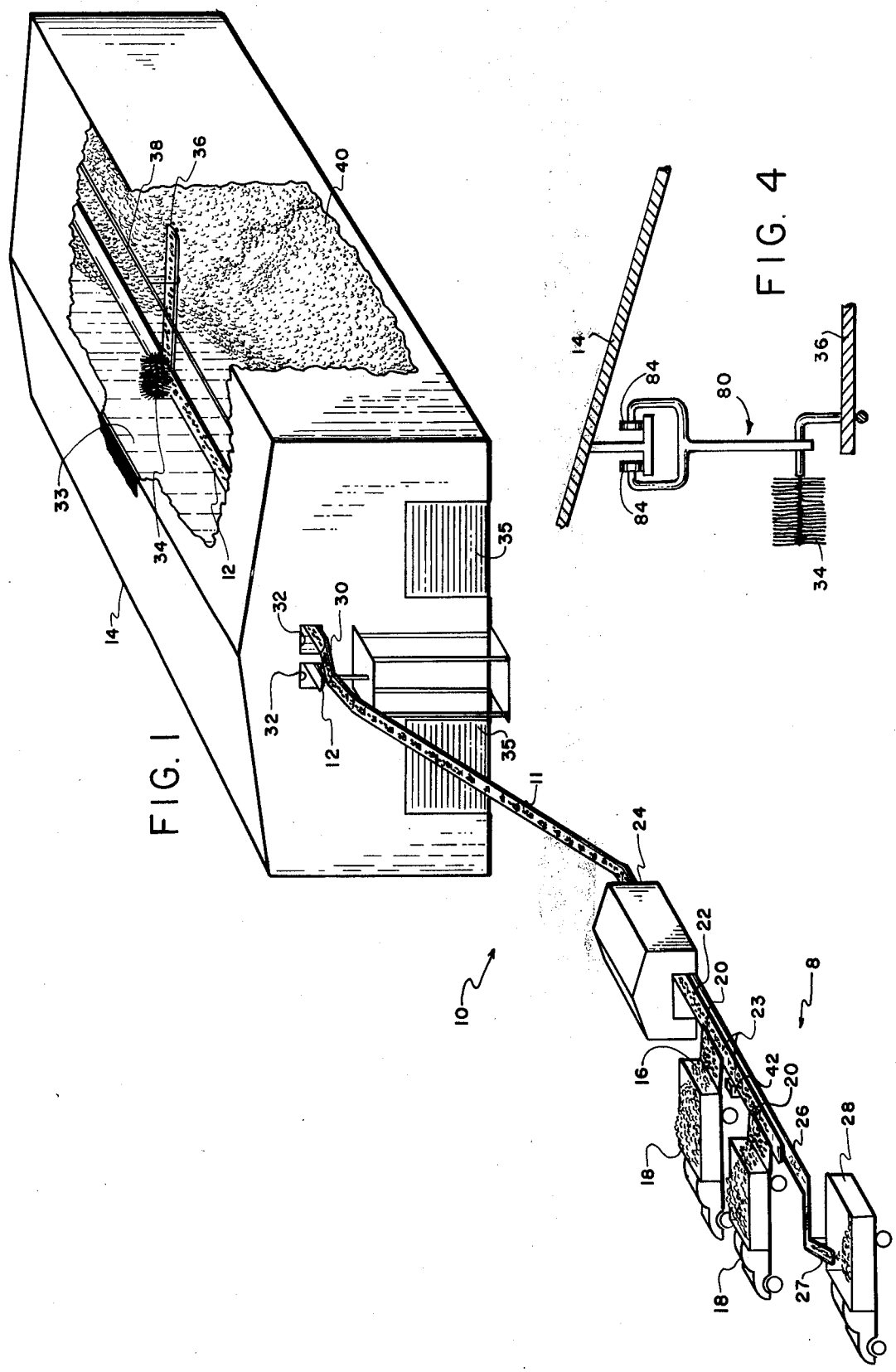
FIG. 1 is a perspective schematic representation of one presently preferred potato storage system according to the present invention.

Reference is now made to the drawings wherein like numerals are used to designate like parts throughout. FIG. 1 in particular schematically illustrates a first presently preferred potato handling and storage system, generally designated 10, in accordance with the present invention. System 10 comprises elongated potato-carrying means illustrated as a network of conveyors. Each conveyor is powered by a motor and supported upon rollers, as is conventional. These features as well as other conventional features are not shown or described since each is well understood by one of ordinary skill in the art. The conveyor network comprises an outside elevating conveyor generally designated 11, by which potatoes deposited from trucks at a delivery or potato-receiving site 8 remote from the storage site, are transported to an elevated part of a storage enclosure, illustrated as building 14. The building is equipped with two parallel longitudinal conveyors which are identical, each being designated 12. Each of the two conveyors 12 extend essentially the full length of the building 14 and are exposed exteriorly adjacent the elevated end of conveyor 11. A transitional conveyor 30 may be interposed selectively between conveyor 11 and either of the conveyors 12 whereby potatoes may be placed in storage on one side or the other of the building 14 in a manner and to an extent more fully described hereinafter.

The delivery site 8 is constructed in such a fashion that potatoes in bulk contained within a bulk handling vehicle, illustrated as trucks 18, may be placed in any suitable fashion (powered or manual) upon one or more unloading aprons 20. Each apron 20 is preferably constructed and operated in a fashion described hereinafter in conjunction with FIGS. 2 and 3, although other suitable unloading aprons may be used.

As a time saving procedure, it is preferred that the trucks 18 be beet or dump trucks which provide for open top loading in the fields during the potato harvesting procedure and allow for rear end tail gate dumping of the receptacle of each truck 18 onto the adjacent apron 20. By facilitating the use of the beet trucks those farmers which raise both beets and potatoes, as is common in southeastern Idaho, may acquire a single truck to be used to harvest both crops and thereby reduce the capital investment of the farmer. By instantaneously directly end dumping all or a substantial part of the entire load of potatoes onto the indicated apron, the "turn around" time for the trucks is substantially shortened. For example, the present unloading system, where the unloading apron acts as an accummulator or hopper and will hold on the order of 250 CWT, about five minutes per 300 CWT is required in lieu of the prior requirement of about, 30 minutes using other techniques. If desired, the tail gate dump can be restricted so as to meter the rate at which potatoes are received upon the unloading apron from the truck. Beet trucks provide the further advantage of functioning during non-harvest periods of time as flat beds, grain hauling units, cattle transport vehicles and the like.

Notwithstanding the preference of dump or beet trucks, belt bottom and other trucks may also be used in conjunction with aprons 20.

Each unloading apron 20 is either inclined so that potatoes co-mingled with tare gently move under force of gravity away from the hauling truck 18 or are equipped with power driven conveyor structure for similarly delivering potatoes from the unloading apron to the distal horizontal end 23 of a slat or like conveyor 22 at the delivery site. The slat conveyor 22 may comprise spaced cross bars and is power driven causing the potatoes received from each unloading apron 20 to be displaced through a tare picking site or station 24, which is preferably covered. Further, the slat conveyor 22 is equipped with rollers that impart high frequency vibration to the potatoes and tare, causing loose dirt, small clods and potato vines to be automatically segregated from the potatoes, which tare falls through the spaces between the slats of the conveyor. Naturally, the spaces between the bars comprising conveyor 22 are such that potatoes due to their larger size are not caused to fall through the conveyor. Inherently, removal of loose dirt, clods, etc. as indicated will also be accompanied by removal of some if not most undesired vegetation such as weeds and potato vines.

Said weeds, potato vines, loose dirt, clods, etc. falling through conveyor 22 are collected upon the top of belt tare conveyor 26, which is displaced in a direction opposite to the displacement of conveyor 22, i.e. to a location remote from both the picking site 24 and the storage enclosure 14. The conveyor 26 has a distal end 27 at which site said removed tare is preferably deposited in an open bed tare truck 28 for disposal, which may include returning the soil to the field. The truck 28 may in fact comprise an empty one of the trucks 18, at a point in time following depositing of the entire load of potatoes from the truck upon an adjacent apron 20.

It is preferred that the manual picking station 24 be covered so as to protect workers from the elements and be properly ventilated or air conditioned. At this picking site, all residual tare is manually removed and placed on tare conveyor 26 which is typically requires the services of only one individual. Thus, the inclined conveyor 11 is intended to transport only "clean" potatoes from the picking station 24 to one or the other of two elevated ingress sites 32 where the distal ends of the two belt conveyors 12 are exposed to receive a continual stream of potatoes from conveyor 11. It is to be appreciated that conveyor 11 need not necessarily be inclined. By way of illustration, in those situations where the surrounding terrain permits disposition of the delivery site 8 and/or the picking station 24 at an elevation comparable to the elevation of ingress opening 32 in building 14 no incline in the ingress conveyor would be needed. Where the incline of conveyor 11 is substantial, it is preferred that the conveyor comprise an anti-roll structure or substance to assure that the potatoes 16 thereon are efficiently transported up the incline without damage.

The relatively short transitional conveyor 30 may be manually or otherwise set in either of two positions so as to funnel the stream of influent potatoes from conveyor 11 onto one or the other of the two parallel interior conveyors 12, the building being divided into two isolated compartments by a wall 33 running along the longitudinal center of the building. Potatoes placed on either of the conveyors 12 are linearly displaced therealong until directly adjacent the current instantaneous piling site. Thus, potatoes being displaced on either conveyor 12 may run the full length of the building 14 or any selected portion thereof as more fully hereinafter described.

A power rotated brush 34 is angularly or diagonally disposed across each conveyor 12 such that the bristles of the rotating brush are caused to be contiguous along the bottom thereof with the top surface of the associated conveyor 12. It is preferred that the top surface of the conveyor at the brush site be flat or horizontal for ease of potato displacement, although other configurations could be used. Further, using any suitable conventional means, the brush 34 is supported such as by hangers 80 from roof beams or trusses 82 in the building 14 so as to accommodate rapid longitudinal repositioning from time-to-time of the brush 34 by the operator of the system. Ordinarily, the brush 34, defining a potato diversion site, is initially placed at either end of the conveyor 12 when the adjacent compartment (one-half of the building) is empty and preparatory to piling the potatoes in the building. Thereafter, as piling proceeds, the brush 34 is rotated opposite to the direction of potato displacement and is periodically relocated along the belt 12 commensurate with the filling of the storage compartment within the building 14.

The rotating brush 34 thus gently brushes the potatoes being linearly displaced by the conveyor 12 diverting the potatoes angularly from the conveyor onto a cross conveyor 36. The conveyor 36 may be supported by hangers 80 from the roof of the building 14 and is advanced along with brush 34. The cross conveyor 36 preferably is horizontal, but, if desired could be sloped downwardly away from conveyor 12 transverse to the conveyor 12 and to the longitudinal axis of the building. If a slope is used, it may be a substantial slope initially to start a pile and the angle thereof selectively reduced as the pile grows. Thus, the inclined angle of the conveyor 36 may be either be fixed or adjustable. Also, the cross conveyor 36 be tilted slightly from one side toward the other so that potatoes are caused to gently roll off the conveyor along the entire length of an instantaneous elongated dumping site comprising said tilted portion onto the existing and progresssively enlarging pile 40 of potatoes being placed in storage. This results in an evenly distributed pile of undamaged potatoes. Power vibrating apparatus 91 may also be used in conjunction with conveyor 36 to disperse potatoes onto the pile 40. Further, one or more additional rotating shear brushes may be used to disperse potatoes from conveyor 36 onto the pile.

It is to be appreciated that both brush 34 and cross conveyor 36 may be movably supported upon hangers, using, for example, rollers 84 which may be moved axially back and forth along rails 82 in a conventional fashion.

To avoid bruising the potatoes during initial start up of the piling process within either compartment of building 14, a sloping supply of potatoes may be initially manually placed at the extreme interior end of the adjacent conveyor 12 upon which additional potatoes may fall without bruising. Or a conventional single piler may be placed in that location against which potatoes are caused to gently fall. In either event, by using the described system, either storage compartment may be completely filled to a uniform depth with little, if any, human assistance other than to set and control the system 10. The only personnel required are three individuals, one at the picking station 24, one controlling the system at control console 42 and one observing and relocating the equipment within the building 14.

It is preferred that conventional control equipment be used to start, stop and regulate the speed of the various conveyors as well as the brush 34. No detailed description is deemed necessary since the components and operations of each are well known. It is preferred that a common control station, such as 42, be available to the operator of the system. The control station 42 may be located at any suitable site adjacent the system 10. The advantage of placing station 42 at the delivery site 8 allows either the operator or one of the truck drivers or the manual picker at site 24 to exercise control over the system 10 as required.

The system provides for fast handling and potato unloading in addition to uniform piling of damage free potatoes in a storage facility using a minimum of personnel, it being understood that the speed of the system may be varied to suit existing conditions at any point in time. Clean-up requirements are minimized and the tare material is kept entirely outside the storage building. In actual testing, the present system has provided a processing capacity of up to 5,000 pounds of potatoes per minute. The storage building comprises a substantially air tight, controlled interior environment which is not materially disrupted by the elevated delivery and placement therein of a stream of clean potatoes.

Potatoes can be conventionally removed from the compartments within the enclosure 14 through either of doors 35.

Figure 2:
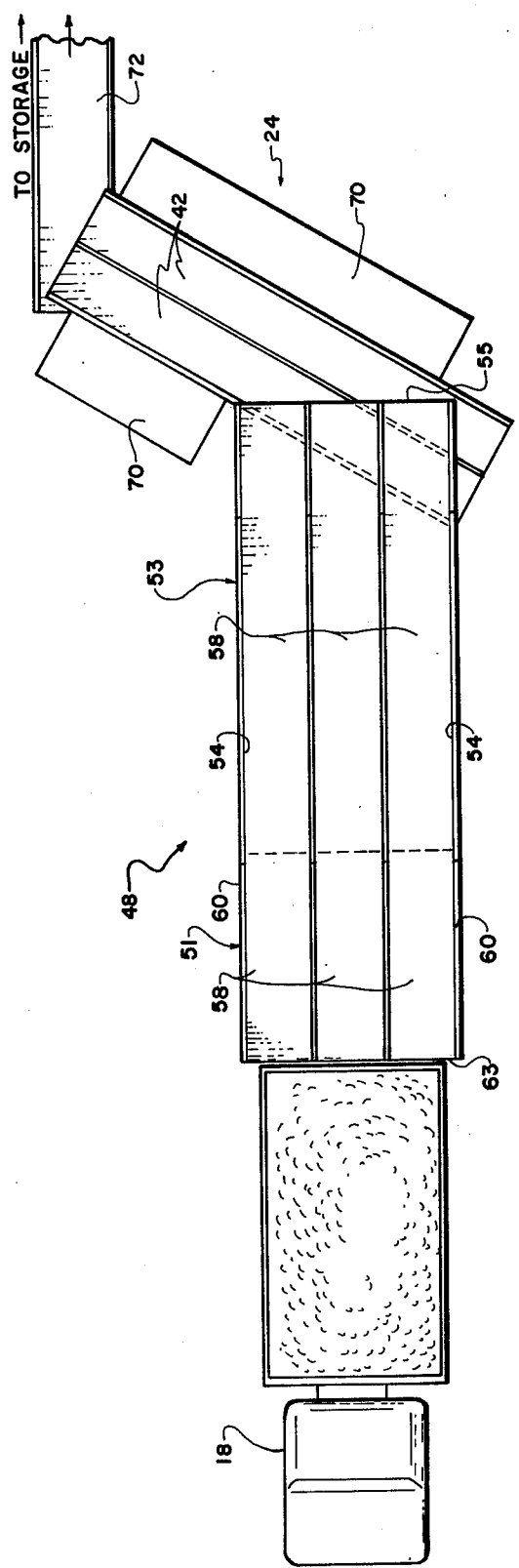
FIG. 2 is an enlarged fragmentary schematic plan view of the unloading portion of a second preferred embodiment of the present invention.
Figure 3:
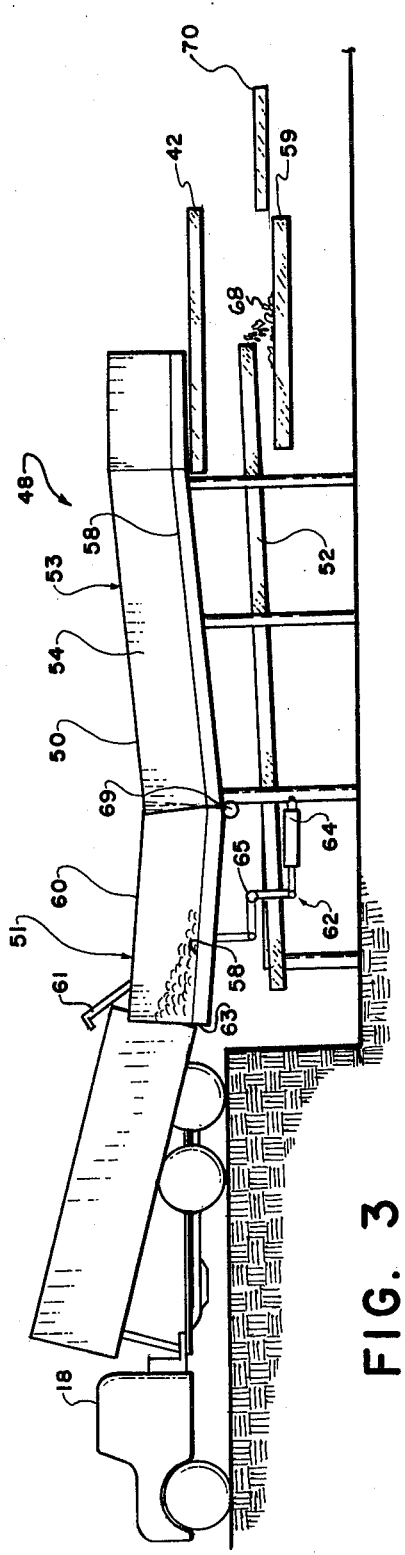
FIG. 3 is a side elevational schematic view of the unloading portion of FIG. 2.

Reference is now made to FIGS. 2 and 3, which illustrate a further potato delivering and picking station embodiment, generally designated 48, according to the present invention. Utilization of the embodiment 48 accommodates vertical placement of an accumulator apron or hopper immediately adjacent the tail gate of the dump truck 18 for rapid delivery of the entire load of potatoes or a substantial portion thereof from the truck to the accumulator apron, and from thence potatoes are displaced along a sloped chute ingress portion 50, across a tare-segregating conveyor portion 58 and onto a pair of picking station conveyors 42 where residual tare, spoiled potatoes, etc. are manually removed, most of the tare falling through the conveyor portion 58 onto a tare conveyor 52.

More specifically, the apron/picking system 48 of FIGS. 2 and 3 comprises a relatively elongated unloading hopper 51 which is wider than the truck 18 and has a series of side boards 60 to aid in receiving, containing and metering delivery of an entire truck load of potatoes, if desired. The hopper 51, in its unloading orientation, is sloped downwardly away from the truck and comprises three parallel slat conveyors 58 by which potatoes received from the truck are displaced.

The effluent portion 53 comprises two vertical side boards 54 and the mentioned three parallel slat conveyors 58. Each conveyor 58 functions as does the previously described conveyor 22 to segregate tare from potatoes.

The system 48 comprises a tare collector conveyor 52 disposed parallel to and immediately beneath the conveyors 58. Tare collected on conveyor 52 is delivered to a further tare collecting belt conveyor 59. Rocks and other tare manually removed at station 24 are placed on belt conveyor 70. It is to be appreciated that the ingress portion 51 together with the intake ends of conveyors 58 is displaceable and hingedly connected at 69 to the fixed portion 53 of the apron.

The displaceable section 51 may be selectively lifted and lowered about hinge 69 at the distal end 63 thereof by two-way cylinder 64 and its associated linkage mechanism 62 which is fixed to and rotatable with pivot shaft 65. Pivot shaft 65 is journaled to the frame of the apron 48 and is caused to pivot responsive to actuation of cylinder 64. Thus, the distal end 63 may be placed adjacent and immediately below the tail gate of each loaded truck 18 which reaches the unloading site and potatoes dumped in large quantities in a relatively short period of time directly onto the displaceable conveyors 58. The illustrated design being capable of receiving and containing an entire truck load of potatoes. It is preferred that during said truck dumping phase, that conveyors 58 operate at high speed until potatoes approach the egress ends of the conveyors. In this fashion, the hauling trucks may be released for further work without appreciable delay, the capacity of the three conveyor hoppers 48 being greater than the capacity of the truck.

The parallel conveyors 58 are preferably displaced at any point in time at a common rate of speed which may be controlled by the operator of the system so that at any point in time a desired stream of potatoes will reach and be displaced along the network conveyor path to the storage enclosure. Any residual tare may be manually removed at opposed picking sites 70.

The manner in which manually picked tare or tare collected and displaced along conveyors 52 and 59 is handled is optional, it being preferred that the tare be placed in a hauling vehicle and removed from the potato unloading site. It is ordinarily desirable, however, to separately dispose of the rocks comprising the tare 68. A suitable valve mechanism may be utilized in conjunction with the lift mechanism 64 in a conventional manner so that as the truck rises and the tail gate thereof lowers against the apron, the apron is forced down to insure that the distance potatoes drop is held to a minimum.

This invention may be emodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent Is:

1. A method of effectively placing the potatoes in storage without damage comprising the steps of:

delivering a stream of potatoes to an elevated relatively small ingress site of a substantially unencumbered potato storage enclosure;

continually conveying the stream of potatoes through the ingress site into the enclosure and substantially linearly on an interior conveyor a selected distance along an elevated part of the enclosure to a predetermined variable diversion site;

continually diverting the stream of potatoes at said diversion site angularly from the conveyor to a repositionable conveyor, the two conveyors being disposed at an angle to each other, the continually diverting step comprising gently brushing the stream of potatoes counter to the displacement of said stream laterally from the interior conveyor at a predetermined site along the length thereof onto the repositionable conveyor;

dumping said stream of potatoes from the repositionable conveyor using at least in part the force of gravity onto an enlarging pile of stored potatoes, an exposed face of which is a very short distance beneath the repositionable conveyor; and repositioning the diversion site and the repositionable conveyor from time to time commensurate with the the enlarging size and expanse of the pile of stored potatoes.

2. A method of efficiently placing potatoes in storage without damage comprising the steps of:

delivering a stream of potatoes to an elevated relatively small ingress site of a substantially unencumbered potato storage enclosure;

continually conveying the stream of potatoes through the ingress site into the enclosure and substantially linearly on an interior conveyor a selected distance along an elevated part of the enclosure to a predetermined variable diversion site;

continually diverting the stream of potatoes at said diversion site angularly from the conveyor to a repositionable conveyor, the two conveyors being disposed at an angle to each other;

dumping said stream of potatoes from the repositionable conveyor using at least in part the force of gravity onto an enlarging pile of stored potatoes, an exposed face of which is a very short distance beneath the repositionable conveyor, the dumping set comprising vibrating the repositionable conveyor causing potatoes to tumble off onto the pile along a substantial length of the repositionable conveyor; and repositioning the diversion site and the repositionable conveyor from time to time commensurate with the enlarging size and expanse of the pile of stored potatoes.

* * * * *